United States Patent [19]
Konishi

[11] Patent Number: 5,857,120
[45] Date of Patent: Jan. 5, 1999

[54] EYE AXIS DETECTOR AND CAMERA WITH EYE AXIS DETECTOR

[75] Inventor: Kazuki Konishi, Tokyo, Japan

[73] Assignee: Canon Kabushiki Kaisha, Tokyo, Japan

[21] Appl. No.: 378,928

[22] Filed: Jan. 25, 1995

Related U.S. Application Data

[63] Continuation of Ser. No. 112,047, Aug. 25, 1993, abandoned, which is a continuation of Ser. No. 746,462, Aug. 16, 1991, abandoned.

[30] Foreign Application Priority Data

Aug. 21, 1990 [JP] Japan .................................... 2-220790

[51] Int. Cl.[6] .................................................. G03B 17/00
[52] U.S. Cl. ............................................. 396/51; 351/210
[58] Field of Search .................................... 354/410, 400, 354/402, 403, 62, 219; 351/210; 396/51

[56] References Cited

U.S. PATENT DOCUMENTS

| | | | |
|---|---|---|---|
| 4,836,670 | 6/1989 | Hutchinson | 354/62 |
| 5,036,347 | 7/1991 | Tsunekawa et al. | 354/400 |
| 5,260,734 | 11/1993 | Shindo | 354/219 |
| 5,262,807 | 11/1993 | Shindo | 354/210 |
| 5,327,191 | 7/1994 | Shindo et al. | 354/410 |

*Primary Examiner*—Russell E. Adams
*Attorney, Agent, or Firm*—Robin, Blecker & Daley

[57] ABSTRACT

An eye axis detector for detecting to which position the eye axis of a user is directed in a picture, comprising means for dividing and specifying the picture into a plurality of pictures, and means for extracting the watching point of the user using a plurality of types of eye axis information concerning the eye axis in each area within such divided picture.

20 Claims, 20 Drawing Sheets

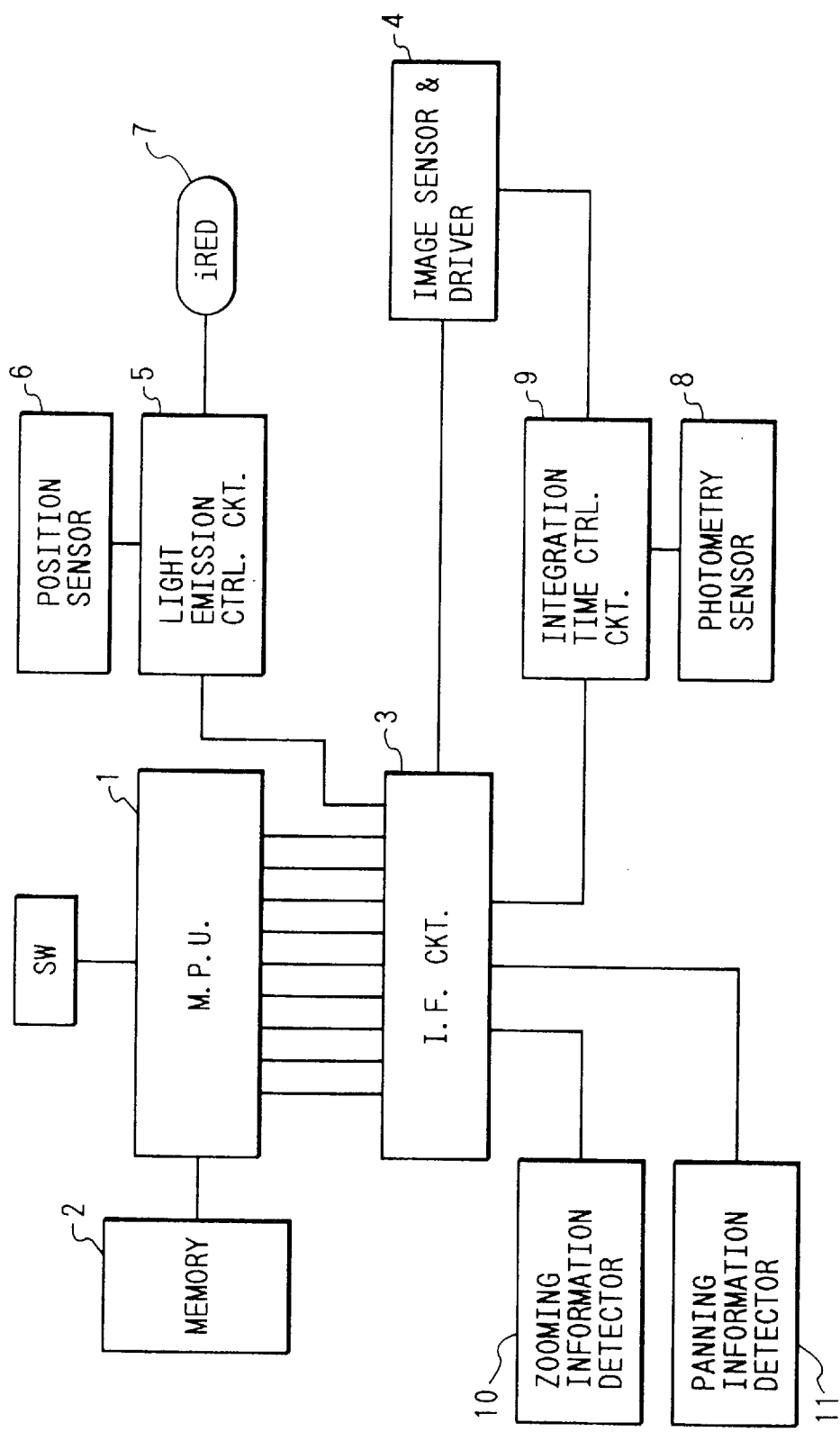

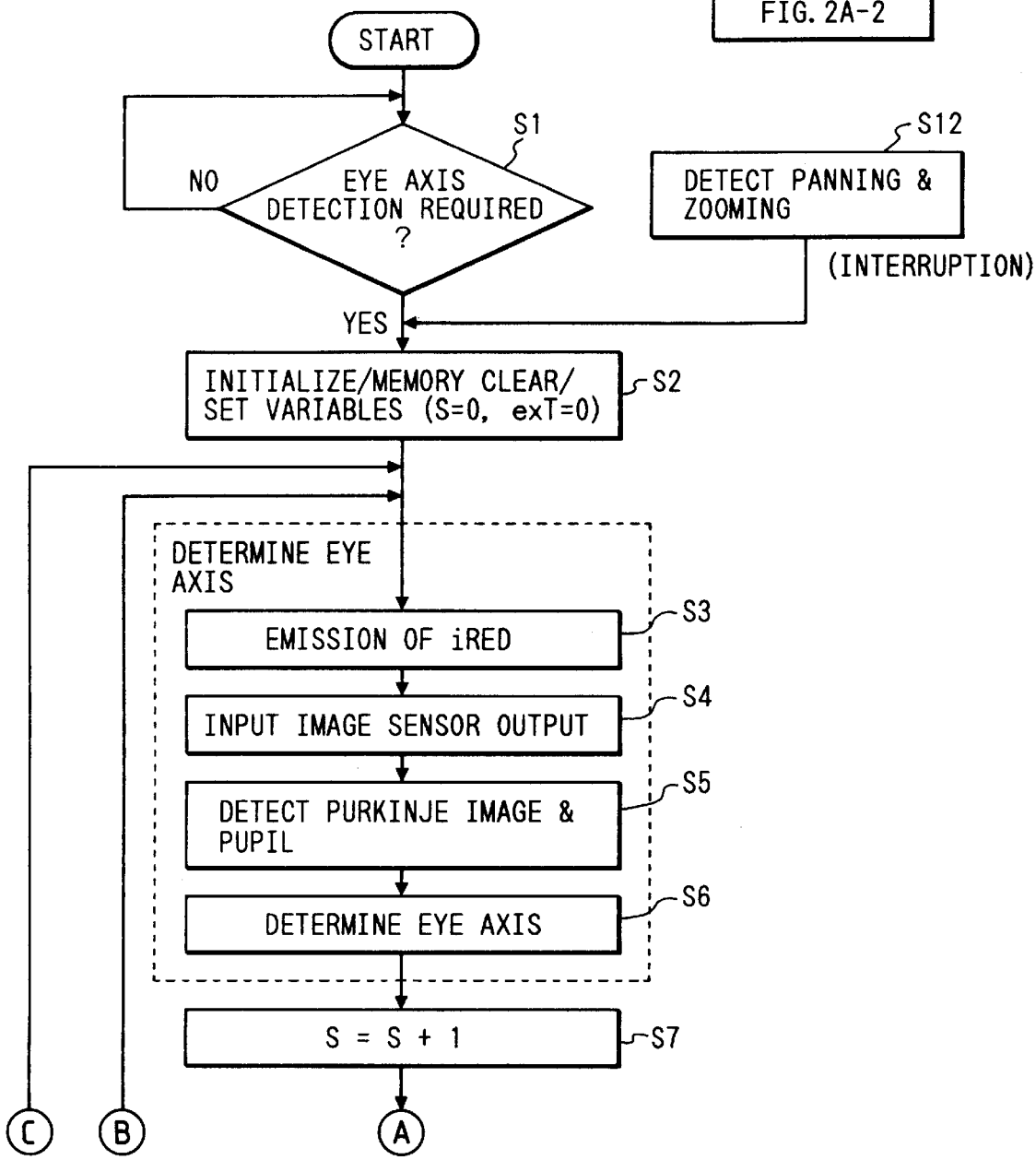

FIG. 3
FIG. 4
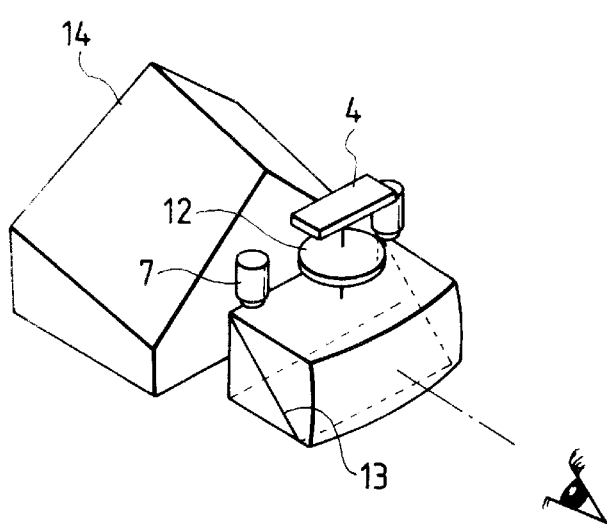
FIG. 5A
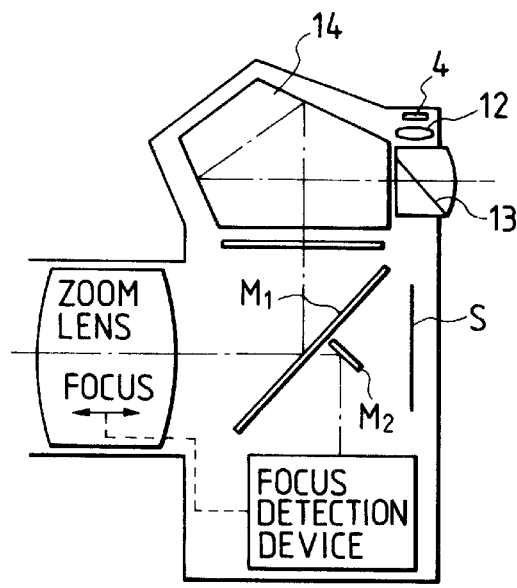
FIG. 5B

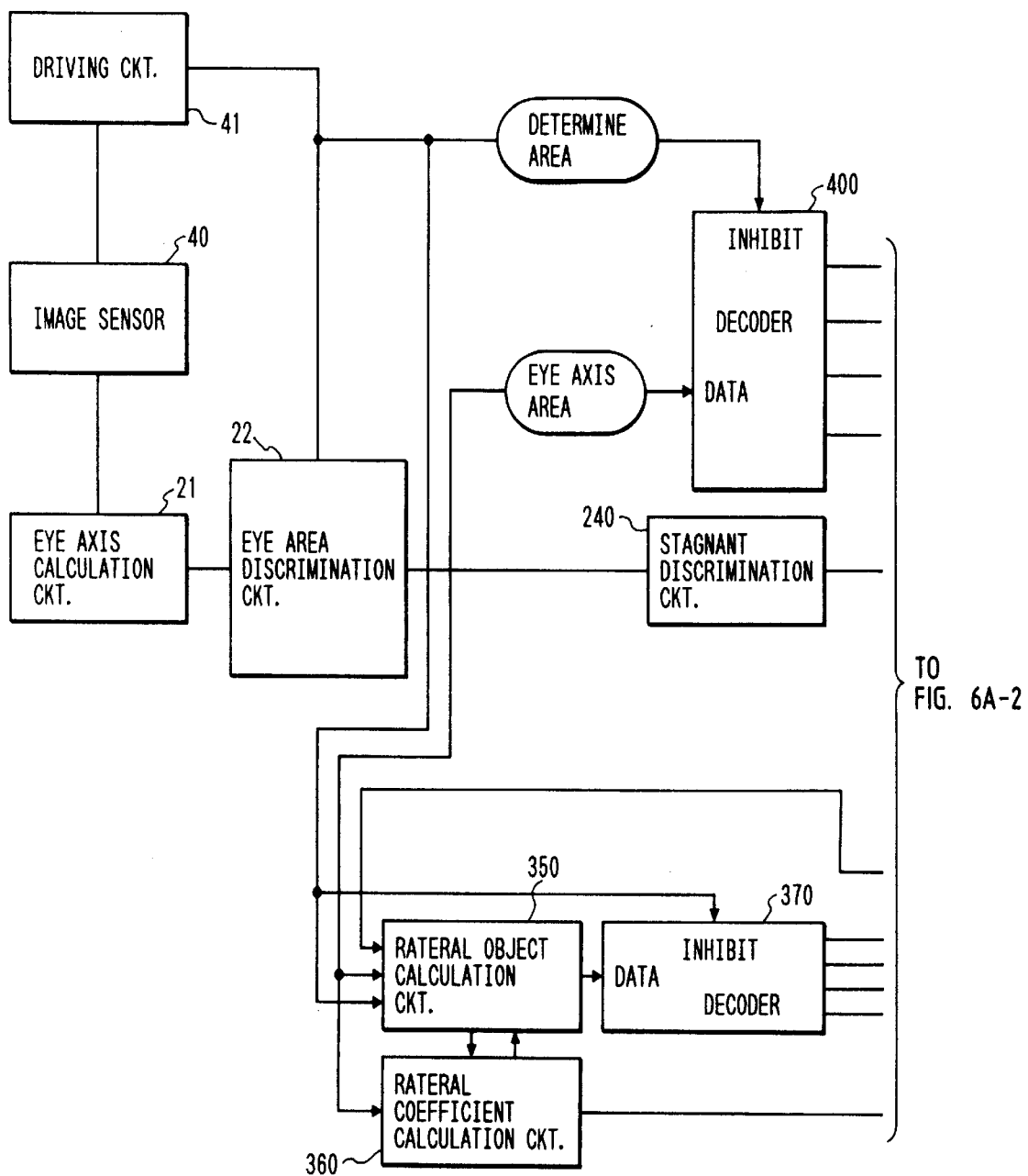

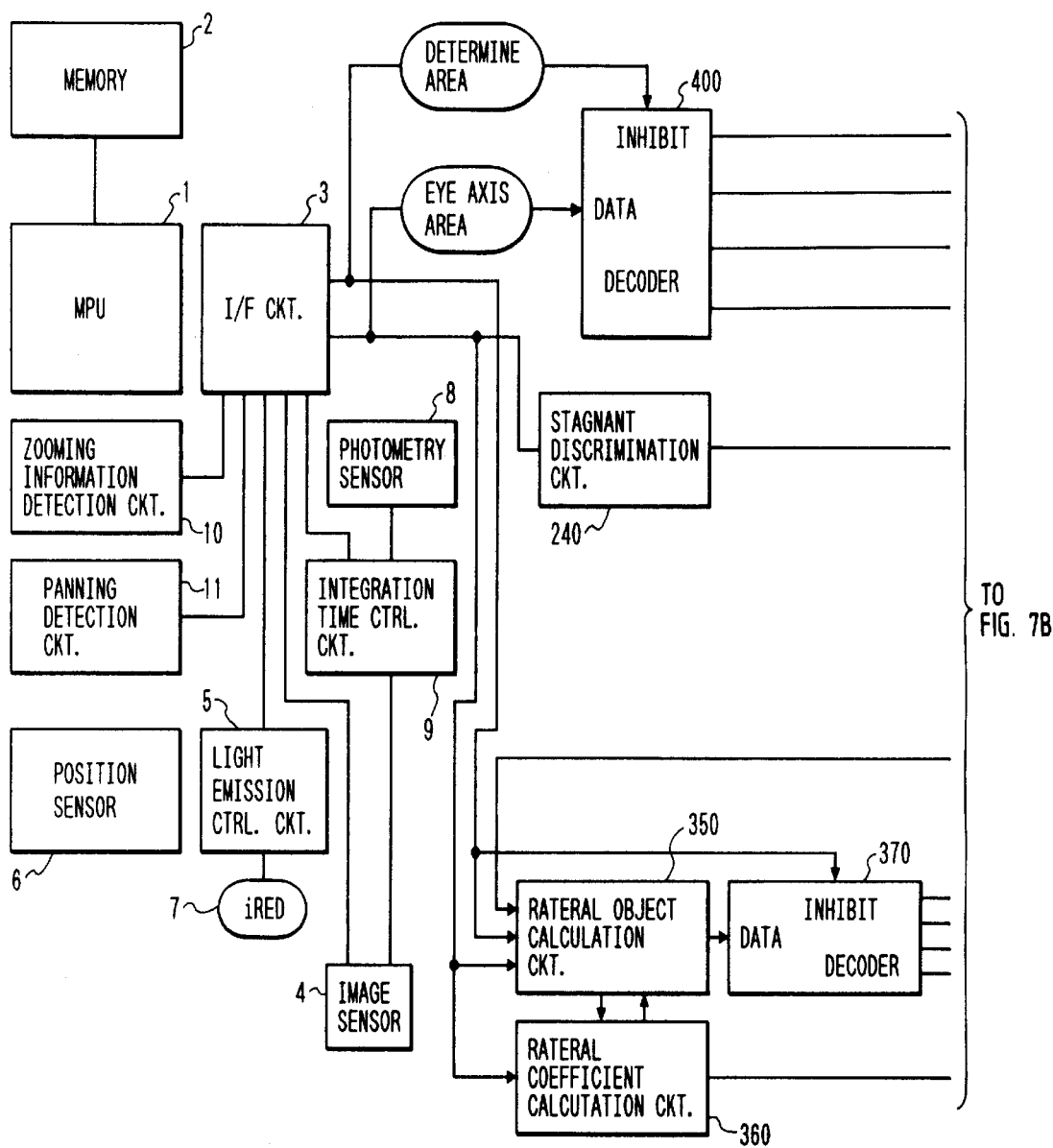

EYE AXIS DETECTOR AND CAMERA WITH EYE AXIS DETECTOR

This is a continuation application under 37 CFR 1.62 of prior application Ser. No. 08/112,047, filed Aug. 25, 1993, abandoned, which is a continuation application under 37 CFR 1.62 of prior application Ser. No. 746,462, filed Aug. 16, 1991 now abandoned.

BACKGROUND OF THE INVENTION

1. Field of the Invention

The present invention relates to an eye axis detector for specifying the watching point of a user or photographer with a still camera, a video camera and so on having the eye axis detector. This case is concerned with the improvement of U.S. Ser. No. 586,228 by the present assignee.

2. Related Background Art

Conventionally, various so-called eye axis detectors have been proposed to determine which position on the observation plane the user (photographer) is watching.

For example, in Japanese Laid-Open Patent Application No. 61-172552, the eye axis (watching point) is obtained by projecting the light flux from a light source onto an anterior portion of the eye to be tested and using a cornea reflected image based on the reflected light from a cornea and an imaging state at the central position of pupil.

FIG. 8 is an explanation view showing a principle of an eye axis detection method proposed in the same application.

In FIG. 8, 704 is a light source such as a light emitting diode for radiating the infrared ray insensible to the observer, which is disposed at a focal plane of a projector lens 706.

The infrared ray emitted from the light source 704 is converged by the projector lens 706, reflected at a half mirror 710, and illuminates a cornea 701 in a bulb 702 of the eye 700. A part of the infrared ray reflected from a surface of the cornea 701 transmits through the half mirror 710 and is focused by a light reception lens 707 to form an image at a position d' on an image sensor 709.

The light flux from end portions a, b of an iris 703 is led via the half mirror 710 and the light reception lens 707 onto the image sensor 709, at positions a', b' of which are formed images of the end portions a, b. When the rotation angle $\theta$ of an optical axis B for the bulb of the eye with respect to an optical axis A of the light reception lens 707 is small, the coordinate Zc at a central position c of the iris 703 can be represented by $$Zc \approx (Za+Zb)/2$$

providing that Z coordinates at end portions a, b of the iris 703 are Za, Zb.

Also, providing that the Z coordinate at an occurrence position d of a cornea reflected image (primary Purkinje image) is Zd, and the distance from a center of curvature 0 for the cornea 701 to a center C of the iris 703 is $\overline{OC}$, the rotation angle $\theta$ of the optical axis B for the bulb of the eye substantially satisfies the expression $$\overline{OC} \cdot \sin\theta \approx Zc - Zd \quad (1)$$

Hence, by detecting a position of each singular point (the occurrence position d of cornea reflected image and images Zd', Za', Zb' of end portions a, b for the iris on the image sensor 709), the rotation angle $\theta$ of the optical axis B for the bulb of eye, and thus the eye axis of the subject can be obtained. Then, the expression (1) can be rewritten as $$\beta \cdot \overline{OC} \cdot \sin\theta \approx (Za'+Zb')/2 - Zd' \quad (2)$$

Where $\beta$ is a magnification determined by the distance l between the occurrence position d of cornea reflected image and the light reception lens 707, and the distance $l_0$ between the light reception lens 707 and the image sensor 709, which is usually almost constant.

In this way, by detecting the direction of eye axis (watching point) for a tested eye of the observer, it can be known which position on a focal plane the photographer observes in a single lens reflex camera, for example.

This is effective in the automatic focus detector, for example, such that where the range finding point is provided not only at a center of picture but also at plural locations within the picture, the automatic focus detection can be performed by selecting the range finding point automatically in such a way as to consider the point at which the observer looks as the range finding point while omitting the observer's trouble to select and input one of their range finding points.

Also, in the division photometry of dividing a photographing range into a plurality of regions and making the photometry in each region, there is an effect of remarkably improving the probability of adapting the exposure to a range intended by the observer by applying the information of watching points as described for the weighting of photometry information in each region.

However, generally, the motion of the bulb of human eye includes a saltatory motion which is caused in extracting image features, with its maximum speed reaching 300 degree/second, an accompanying motion, slow and smooth, which occurs for an object moving at less than 30–35 degree/second, and in addition, a fixation minor motion which is irregular, occurring involuntarily to continue to catch an object matter at a central pit. In the still camera or video camera, a display outside the field within a finder may be seen. Thereby, with the eye axis detector as shown in a conventional example, it was difficult to detect correctly the direction of the eye axis or the watching point to an object intended by the observer (or photographer).

SUMMARY OF THE INVENTION

A main object of the present invention is to detect the direction of eye axis correctly.

Another object of the present invention is to allow the extraction of the watching point intended by the user by multi-dividing an observed picture (or finder picture in a camera) of the user, and using a plurality of informations concerning the eye axis, such as the frequency at which the photographer's eye axis is directed to the divided picture, the stagnant time, and the correlation degree (so-called trajectory information) based on the difference between the direction of the eye axis immediately before or a fixed time before (first point at which the eye axis has largely moved) and that of the current eye axis.

BRIEF DESCRIPTION OF THE DRAWINGS

FIG. 1 is a block diagram in a first example of the present invention.

FIG. 4 is a view showing one example of the correlation coefficient.

FIG. 5A is a view showing the arrangement of an eye axis detector.

FIG. 5B is a cross-sectional view of the optics in a camera.

DESCRIPTION OF THE PREFERRED EMBODIMENT

EXAMPLES

A configuration diagram in the first example of the present invention is shown in FIG. 1, and the operation flowcharts are shown in FIGS. 2A–2E. 1 is a micro processing unit (M.P.U.), 2 is a memory, 3 is an interface circuit having the A/D conversion feature, 4 is an image sensor and its driving circuit, 5 is a light emission control circuit for an infrared light emitting diode, 6 is a position sensor for detecting the horizontal and vertical positions of camera, 7 is the infrared light emitting diode, 8 is a photometry sensor, 9 is an integration time control circuit for controlling the integration time of the image sensor in accordance with the output of the photometry sensor, 10 is a zooming information detector, 11 is a panning information detector, and SW is an eye axis mode switch.

Figures 2, 2A:
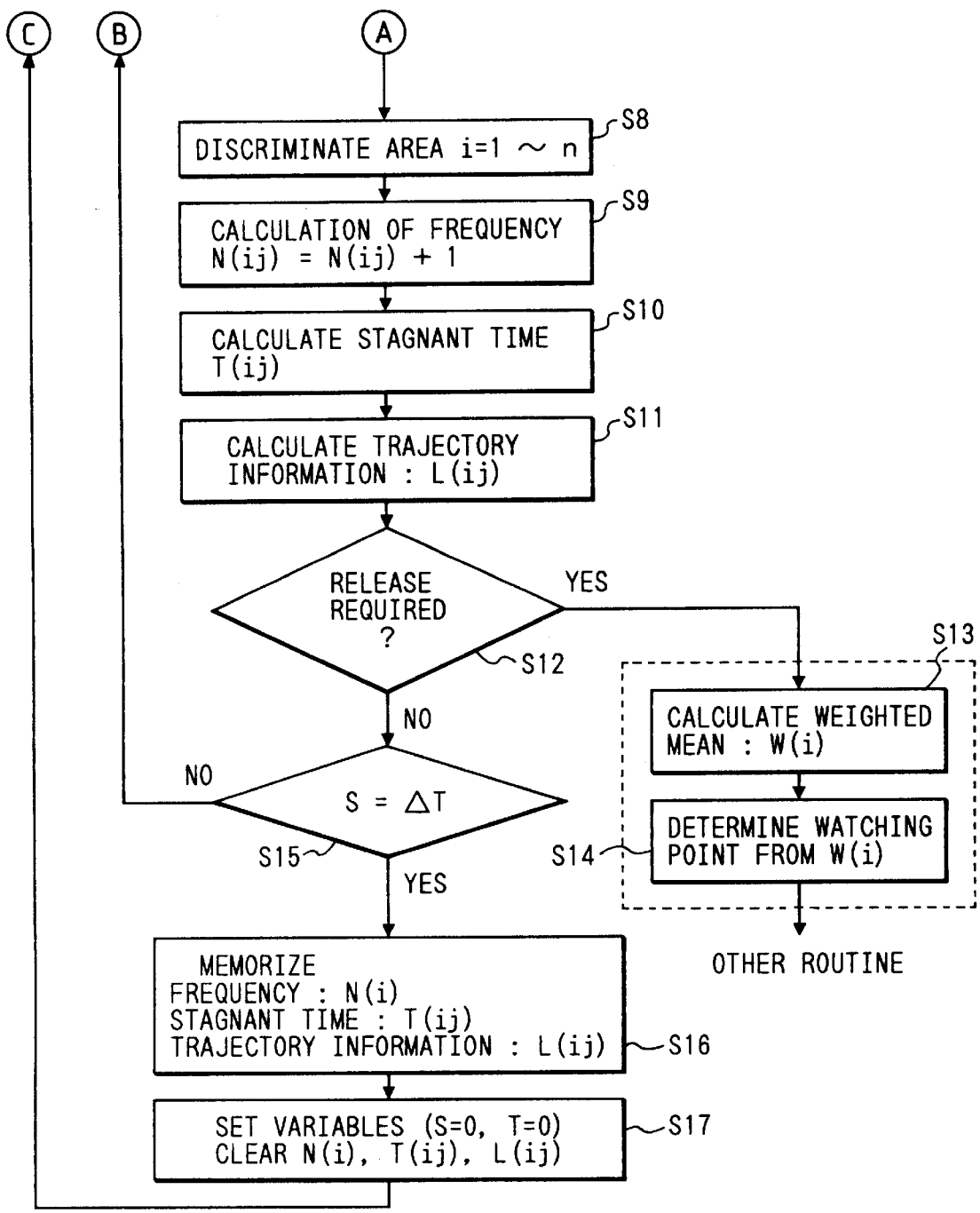
FIGS. 2A–2E are flowcharts showing the operation of the example.

Next, the operation procedure will be described (see FIG. 2A).

If the eye axis detection is required (step 1), such as depressing of the eye axis mode switch SW provided on the camera, M.P.U.1 transfers the control to a routine of the eye axis detection—watching point extraction.

First, the initialization is performed to set the values of all variables to be zero (step 2) and then a light emission control signal is given in synchronism with the integration time of the image sensor to the light emission control circuit 5 which has set the infrared light emitting diode (IRED) 7 emitting the light by receiving the information of the camera position (vertical or horizontal position) from the position sensor 6. Thereby, the infrared light emitting diode in correspondence with the position of the camera at that time is caused to emit the light in synchronism with the accumulation of the image sensor (step 3). Subsequently, an image on the anterior portion of the eye bulb generating a purkinje image which is formed on the image sensor 4 is input via the interface circuit 3 (step 4). And through the processing of that image, the position P of purkinje image and positions of at least three pupil annulus portions $D_1$, $D_2$, $D_3$ (so-called pupil edge) are detected (step 5). Using those detected values, the rotation angles $\theta_H$, $\theta_V$ of the bulb of the eye in the horizontal and vertical directions are calculated (steps 6, 7). The calculation is conducted by using the above expression (2) as in the conventional example. In the eye axis detector applied to the camera as in this example, the relative displacement of the bulb of the eye with respect to a camera main body must be obtained together with the rotation angle of the bulb of the eye. Because the positional relation between the camera main body and the photographer is free in the camera, the position of the eye axis may be changed depending on the position at which the photographer views the finder. However, with the finder of camera, the viewing points on the focal plane may coincide if the rotation angles are the same irrespective of different relative displacements, due to its optical characteristics, whereby it is sufficient that the rotation angle of the bulb of the eye is only obtained.

Figures 2, 6A:
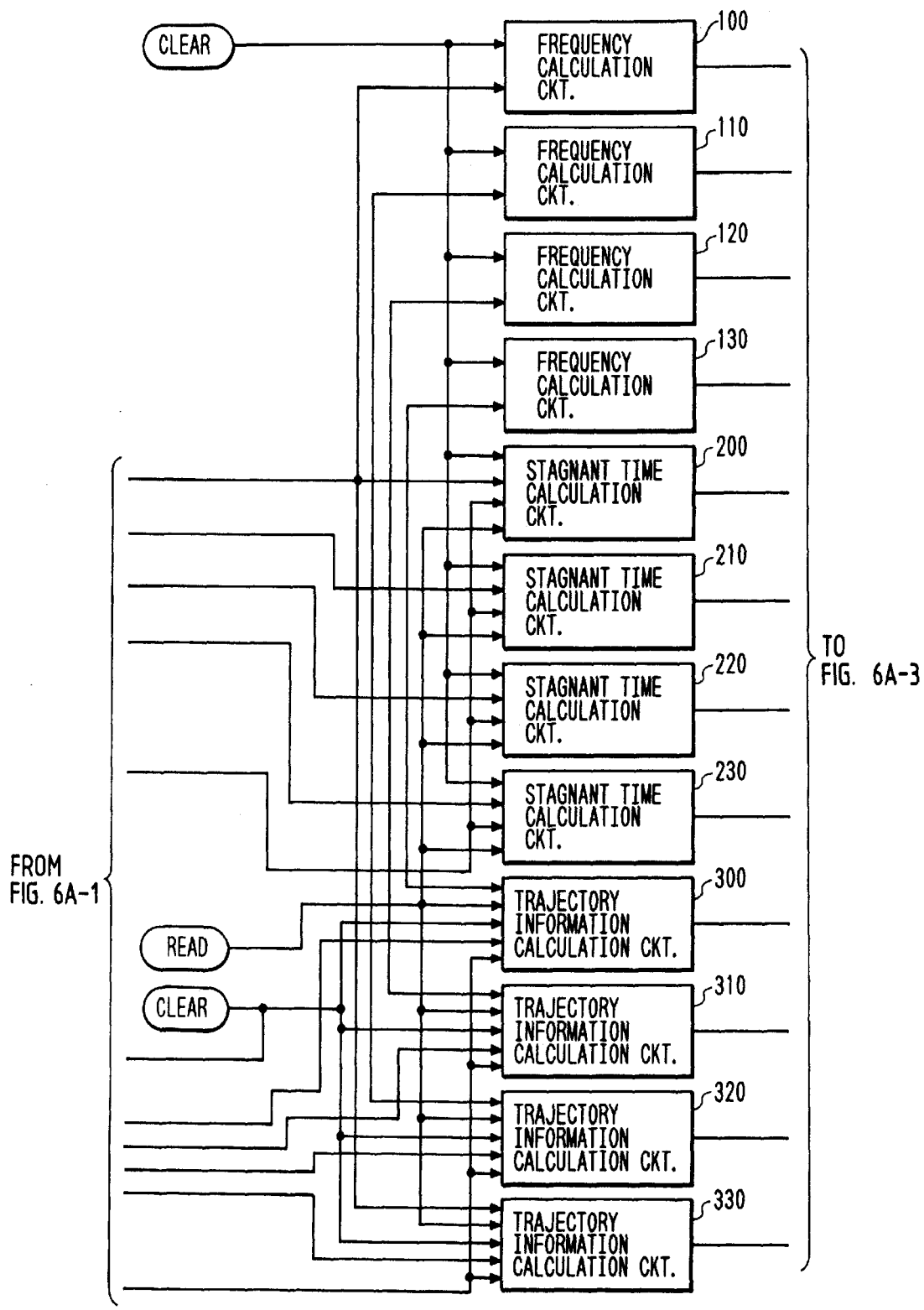
FIGS. 6A–6E are circuit block diagrams in a second example of the present invention.
Figures 3, 6A:
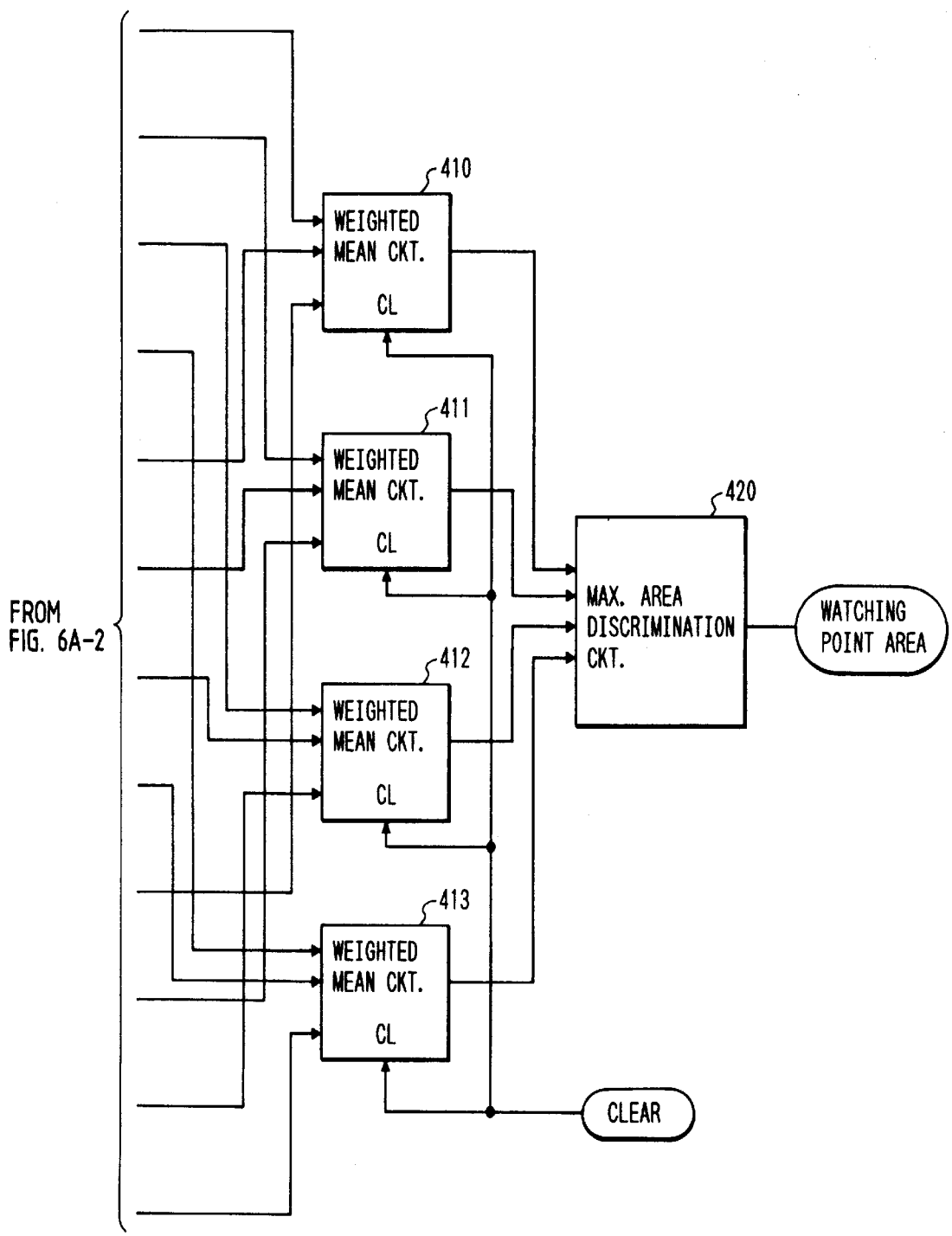
FIG. 3 is a view showing one example for the division of a picture.
Figure 6B:
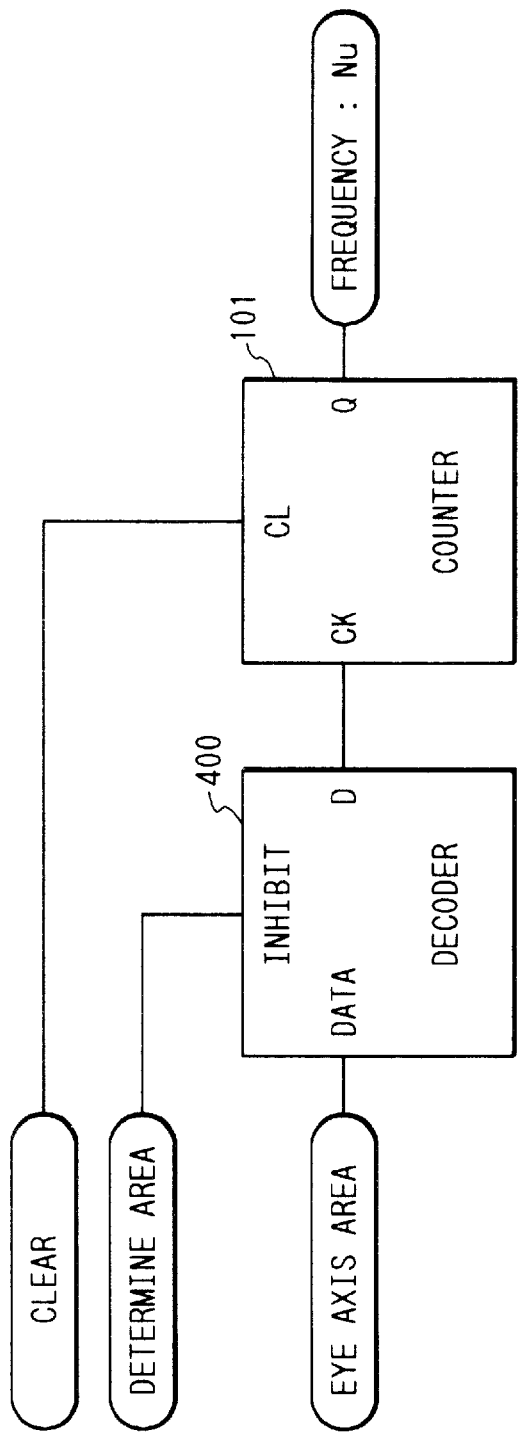

And then, by obtaining at which position the eye axis calculated is placed in a multi-divided observation picture as shown in FIG. 3, the number of its divided picture is stored as ij in the memory (step 8). Moreover, M.P.U.1 calculates the information of frequency, stagnant time and trajectory for the. eye axis for each $\Delta t$ second, and its results are stored (steps 9 to 11). The operations for the eye axis calculation, the area discrimination and the eye axis information calculation are repeated until the release is required.

The calculation of frequency N(ij) is conducted by creating the memory areas of the same number as the number of divided pictures, and adding one to the memory corresponding to its divided picture every time the eye axis is calculated. That is, for $\Delta t$ second from the start of eye axis detection to the release request, the number at which the eye axis exists in each divided picture is counted.

Figure 2B:
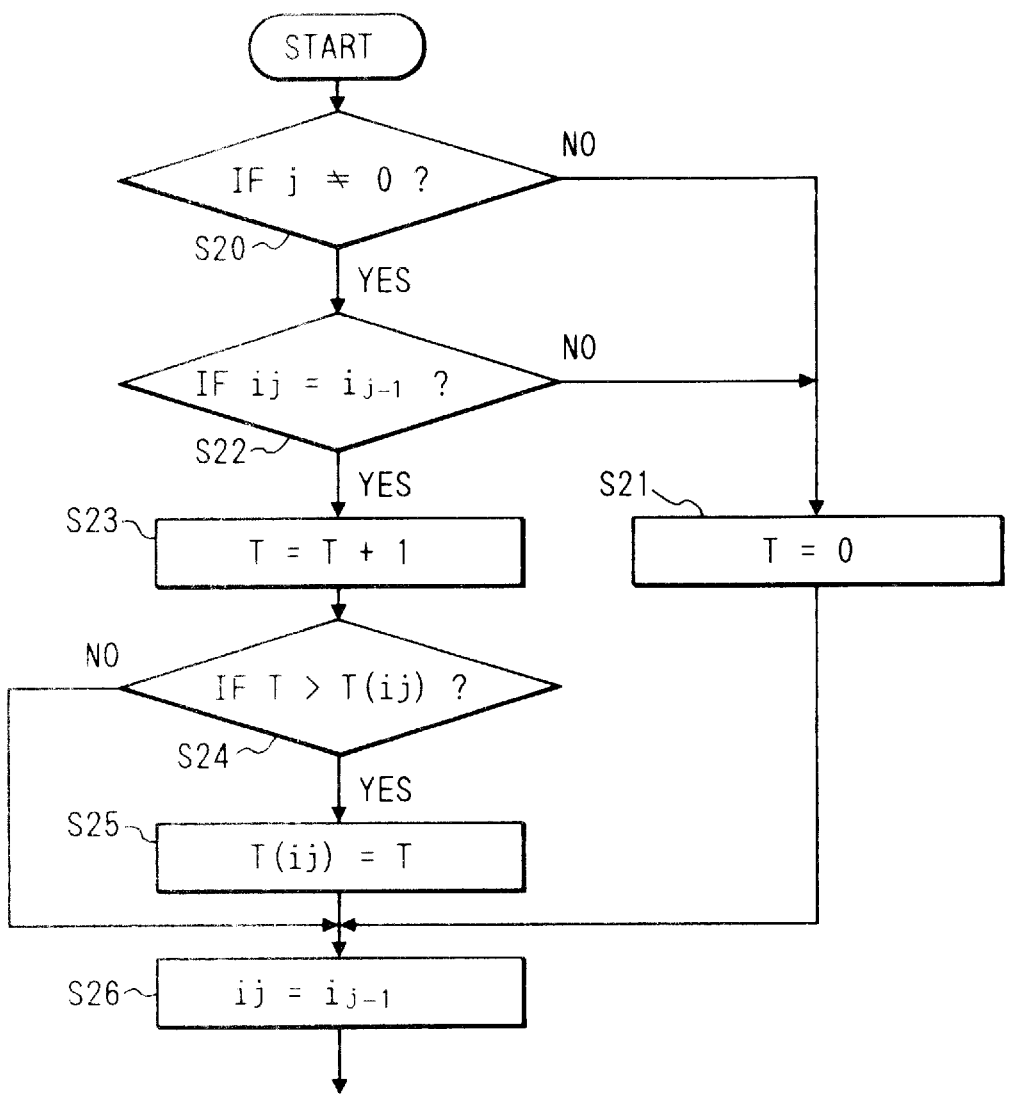

The calculation of stagnant time T(ij) is shown in FIG. 2B. Entering a routine of stagnant time calculation, it is first determined whether not the eye axis calculation is at the first time (step 20), in which this determination can be performed based on whether the value of memory j is "1" or "0". If j=0, it is the first time eye axis calculation. If the first time is determined at step 20, "0" is set to the value of memory T (step 21), and further, the number ij of the divided picture where the eye axis currently exists is memorized as $i_{j-1}$ (number of the divided picture where the eye axis exists at the eye axis calculation one time before). And in the second and subsequent times (i.e., j=1), it is determined whether or not it is equal to the divided picture $i_{j-1}$ where the previous eye axis existed (step 22), and if it is equal (ij=$i_{j-1}$), "1" is added to the value of memory T, and its value is set as a new value of memory T (step 23). Among the memories for calculation of stagnant time prepared by the number of divided pictures, the memory T(ij) corresponding to the divided picture where the eye axis currently exists and the value of T are compared (step 24). If the value of T is greater than T(ij), the value of T(ij) is replaced with the value of the T (step 25). And finally, the number of divided picture ij where the eye axis currently exists is memorized as $i_{j-1}$, (step 26). Also, when the divided picture ij where the eye axis currently exists is not equal to previous one $i_{j-1}$ (ij≠$i_{j-1}$), the value of memory T is set to zero, and then ij is memorized as $i_{j-1}$, and an exit from this routine is made.

That is, this routine obtains the maximum stagnant time during which the eye axis has stayed in the divided picture in $\Delta t$ second.

Figure 2C:
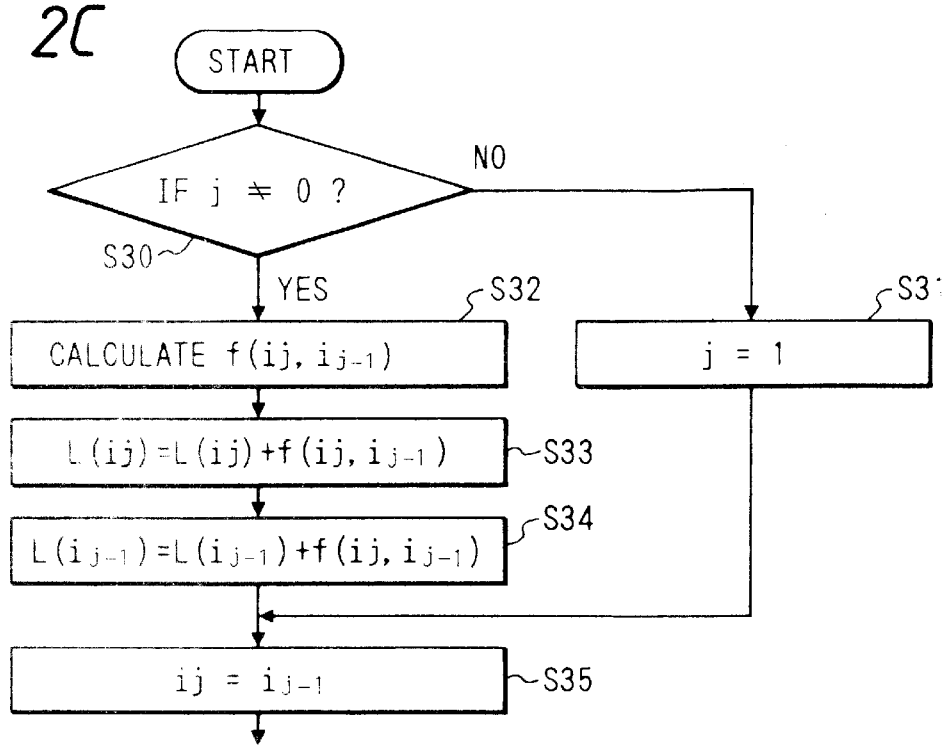
Figure 2D:
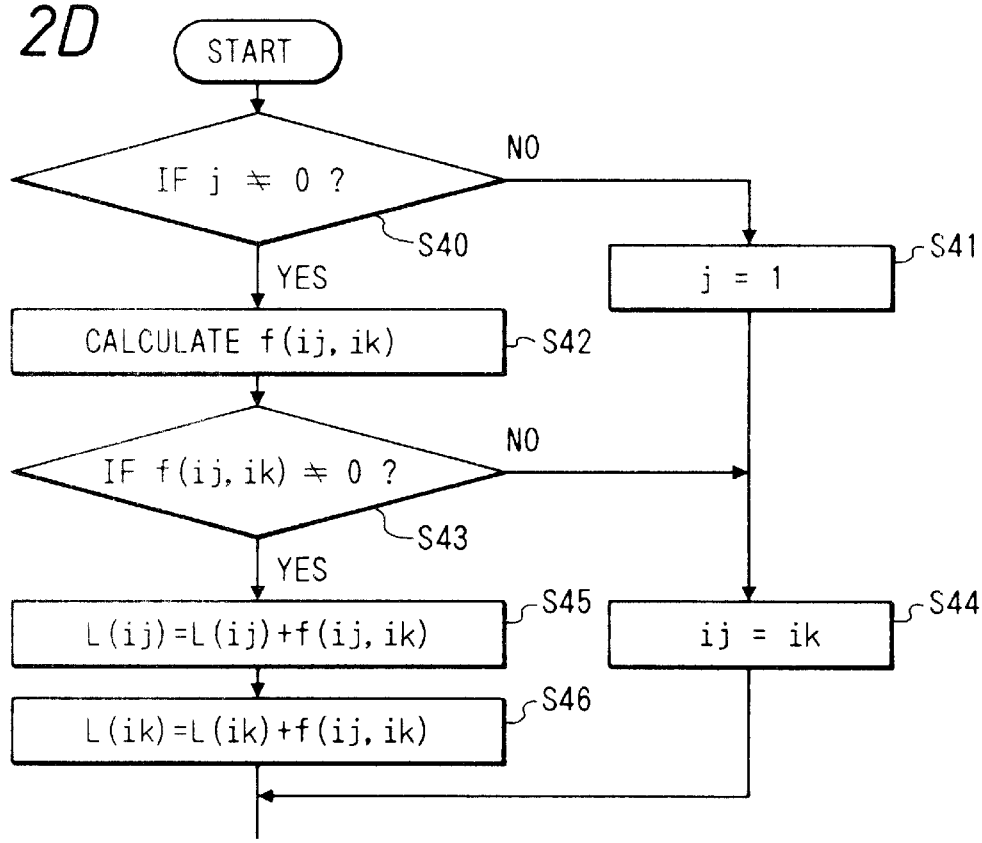

The calculation of trajectory information L(ij) is shown in FIGS. 2C and 2D. In FIG. 2C, the current position of the eye axis and the immediately previous position of the eye axis are compared, and its correlation degree is obtained. In FIG. 2D, the correlation degree between the current position of the eye axis and the first point after saltation (or first position at which the correlation becomes zero) is obtained.

With a method of FIG. 2C, it is first determined whether or not the calculated eye axis is at the first time (step 30), and if it is at the first time, the value of j is changed from "0" to "1" (step 31), ij (divided picture number where the current eye axis exists) is memorized as $i_{j-1}$ (divided picture number where the previous eye axis exists), and the exit from the routine occurs (step 35). Conversely, in the second and subsequent times, the correlation coefficient $f(ij, 1_{j-1})$ between $1_j$ and $i_{j-1}$, is obtained (step 32). For example, this has values as shown in FIG. 4. The slanting line portion in the figure is a position of the previous eye axis, i.e., $i_{j-1}$, and if the current eye axis position ij coincides with $i_{j-1}$, $f(ij,i_{j-1})=1$, in which in leaving farther away from this slanting line position, the value is smaller such as $f(ij, i_{j-1})=0.5$, $f(ij, i_{j-1})=0.2, \ldots$ and if leaving away beyond a predetermined amount, $f(ij, i_{j-1})=0$. In this way, $f(ij, i_{j-1})$ can be determined to be proportional to the inverse of the distance between two values ij and $i_{j-1}$. The correlation coefficient $f(ij, i_{j-1})$ obtained in this way is added to the trajectory information L(ij) for ij and the trajectory information $L(i_{j-1})$ for $i_{j-1}$, (steps 33, 34), respectively, and they are set as new trajectory information L(ij) and $L(i_{j-1})$ for ij and $i=_{j-1}$. Then, ij is memorized as $i_{j-1}$ (step 35) and the exit from the routine occurs.

Also, with a method of FIG. 2D, it is determined whether or not the calculated eye axis is at the first time (step 40), and if it is at the first time, the value of j is changed from "0" to "1" (step 41), and ij is memorized as ik (divided picture number where the first eye axis after saltation exists) (step 44), and the exit from the routine occurs. Conversely, in the second and subsequent times, the correlation coefficient f(ij,ik) between ij and ik is obtained (step 42). This value can be determined to be proportional to the inverse of the distance between ij and ik. Next, it is determined whether or not the correlation coefficient f(ij, ik) obtained is zero (step 43), and if it is zero, ij is memorized as ik (step 44). That is, when the correlation coefficient becomes zero because of the separation beyond a fixed distance from the eye axis position ik which has been used for the calculation of correlation coefficient, it is decided that a great movement from that eye axis position has occurred, and the current eye axis position ij is set as a new eye axis position for the calculation of the correlation coefficient. If the change of ik is terminated, the exit from a routine of trajectory information calculation occurs. Also, if it is not zero, the obtained correlation coefficient f(ij,ik) is added to the trajectory information L(ij) for ij and the trajectory information L(ik) for ik, respectively (steps 45, 46), and the results are memorized as new trajectory informations L(ij) and L(ik), and then the exit from the routine occurs.

Figure 2E:
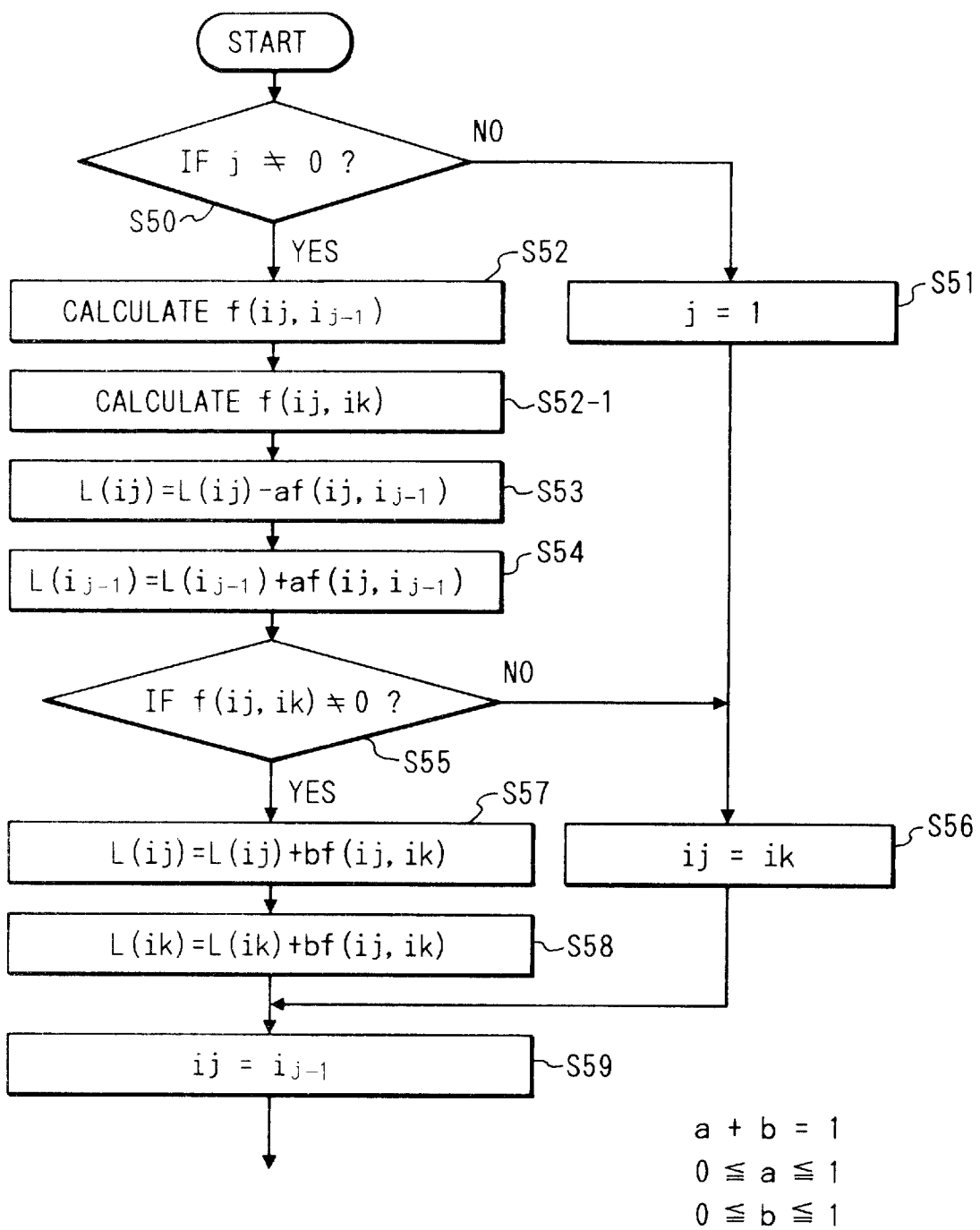

Also, the methods of FIGS. 2C and 2D as above described can be used together. The flowchart for that case is shown in FIG. 2E. With the method of FIG. 2E as in FIGS. 2C and 2D, it is first determined whether or not the eye axis calculation is at the first time (step 50), and if it is at the first time, the value of j is changed from "0" to "1" (step 51), and ij is memorized as ik (step 56) and further memorized as $i_{j-1}$ (step 59), and then the exit from the routine occurs. Conversely, in the second and subsequent times, the correlation coefficient $f(ij,i_{j-1})$ between ij and $i_{j-1}$ and the correlation coefficient f(ij,ik) between ij and ik are calculated (steps 52, 52-1). These values can be determined to be proportional to the inverses of the distances between ij and $i_{j-1}$, and between ij and ik, respectively, as in FIGS. 2C and 2D. Subsequently, the correlation coefficient $f(ij,i_{j-1})$ between ij and $i_{j-1}$ multiplied by an arbitrary number a ($0 \leq a \leq 1$) is added to the trajectory information L(ij), $L(i_{j-1})$ for ij, $i_{j-1}$, respectively (steps 53, 54). It is determined whether or not the correlation coefficient f(ij, ik) between ij and ik is zero (step 55), and if it is not zero, the correlation coefficient f(ij,ik) between ij and ik multiplied by arbitrary constant value b ($0 \leq b \leq 1$ and a+b=1) is added to the trajectory information L(ij), L(ik) for ij, ik, respectively (steps 57, 58). If it is zero, ij is memorized as ik to set ij as a new eye axis position for the calculation of the correlation coefficient (step 56). Finally, ij is memorized as $i_{j-1}$ (step 59), and the exit from the routine occurs.

The flowchart of FIG. 2A is referred to again.

The calculation of such a trajectory information is performed for each $\Delta t$ second (step 15), and each value is memorized. If the panning or zooming is made, a panning detector 11 or a zooming detector 12 detects it, and an interrupt is instructed (step 12). If this interrupt occurs, M.P.U.1 clears all the eye axis information previously calculated such as the frequency, stagnant time and trajectory, sets the variables, and initializes the eye axis calculation routine (step 2). Then, the processing and storage for the eye axis calculation, area discrimination, frequency calculation, stagnant time calculation, trajectory information calculation (step 16) and the set of variables (step 17) are repeated until the release is required.

In the above way, the eye axis information for the frequency, stagnant time and trajectory can be obtained.

If the release is required (step 12), M.P.U.1 extracts the watching point as in the following manner.

M.P.U.1 calculates the total frequency $N_T(i)$, stagnant time $T_T(i)$ and trajectory information $L_T(i)$, using each information for the frequency, stagnant time and trajectory on each divided picture for each time, with the following expressions, $$N_T(i)=N_m(i)+N_{m-1}(i)+AN_{m-2}(i)$$

$$T_T(i)=T_m(i)+T_{m-1}(i) \text{ A}T_{m-2}(i)$$

$$L_T(i)=L_m(L_{m-1}(i)+AL_{m-2}(i)$$

where $N_m(i)$, $T_m(i)$ and $L_m(i)$ are the last (immediately before the release) frequency, stagnant time and trajectory information, and $N_{m-k}(i)$, $T_{m-k}(i)$ and $L_{m-k}(i)$ are the information provided k times before. The value "1" for the weight of the information immediately and two times before the release is to attach importance to the information for $\Delta t$ immediately before the release, irrespective of the timing. By using the information for At before that time, the will of the photographer can be further reflected. Note that A is desirably a value of about ½.

Next, M.P.U.1 calculates the weighted mean of the information for the frequency, stagnant time and trajectory on each divided picture stored in the memory, such as $$W(i)=(w_1N(i)+w_2T(i)+w_3L(i))/(w_1+w_2+w_3)$$

i: divided picture number to obtain the watching degree W(i) for each divided picture (step 13). The divided picture in which the watching degree is maximum or nearly maximum is considered as the watching point (step 14). A group of divided pictures is such that the difference from the maximum watching degree will lie within a fixed value K (which is determined by the focal distance of the taking lens, its iris value, and the period of the eye axis calculation), but that divided picture in which the difference from the least watching degree lies within the fixed value K can be included in the group of divided pictures. Among the group of divided pictures further newly obtained, those having the difference from the least watching degree lying within the fixed value K can be included. Hence, multiple watching points may be provided.

For example, in a case where the watching degree for each divided picture is obtained such as W1>W2>W3>W4>W5>W6 . . . , if for the maximum value W1, the following expressions stand, $$W1-W2 \leq K$$

$$W1-W3 \leq K$$

$$W1-W3 > K$$

$$W3-W4 \leq K$$

$$W4-W_5 > K$$

the divided picture having the watching degree for W1, W2, W3 and W4 is considered as the watching point (step 14).

Then, the control of the camera transfers to another routine of release, where the range finding and the photometry are performed at the watching point as above obtained, and based on that result, the focus control and exposure control are performed.

Also, after the release operation is carried out, the operation is placed in a wait state for an eye axis detection request unless the main switch is not turned off.

Note that the eye axis detector is constituted of the image sensor 4, the infrared light emitting diode 7, the light reception lens 12, and a dichroic mirror 13 (which transmits the visible light but reflects the infrared light), as shown in FIG. 5A, and disposed near a pentagonal prism 14 of the finder. FIG. 5B shows schematically the arrangement of optics in a single lens reflex camera, in which the light passing through the zoom lens is reflected at a main mirror M1 and directed to the pentagonal prism 14, M2 is a sub mirror, from which the reflected light is directed to a focus detection device or photometry device. S is a shutter.

A block diagram and circuit diagrams in the second example of the present invention are shown in FIGS. 6A–6E.

41 is a driving circuit for the image sensor, 40 is the image sensor, 21 is an eye axis calculation circuit, 22 is an eye area discrimination circuit, 100, 110, 120, 130 are frequency calculation circuits, 200, 210, 220, 230 are stagnant time calculation circuits, 240 is a stagnant discrimination circuit, 300, 310, 320, 330 are trajectory information calculation circuits, 350 is a correlation object calculation circuit for calculating the area of object in obtaining the correlation coefficient, 360 is a correlation coefficient calculation circuit for calculating the correlation coefficient with the area determined by the calculation circuit 350, 370, 400 are decoders, 410, 411, 412, 413 are weighted mean circuits, and 420 is a maximum area discrimination circuit for extracting the maximum value among weighted mean values obtained by the decoders 410 to 413 or the area of the watching point.

If an image on the anterior portion of the the bulb of the eye is read out from the image sensor, with a read signal from the driving circuit 41, the Purkinje image, pupil center and eye axis position are calculated in the eye axis calculation circuit 21. Also, an area determination signal is output in synchronism with the termination of reading from the driving circuit 41, and synchronously, a signal corresponding to the area is output from the eye axis area discrimination circuit 22. This signal is decoded in the decoder 400, and the decoded output is sent to the frequency calculation circuit, stagnant time calculation circuit and trajectory information calculation circuit, in correspondence with that area.

In the frequency calculation circuit to which the decoded output is sent, the decoded output is counted in the counter internally provided to obtain the frequency N(i). This counter clears its output if the CLEAR signal occurs with the release, zooming, panning and the occurrence of the READ signal (which occurs when At second has passed or due to the READ signal or release. See FIG. 6B.)

Figure 6C:
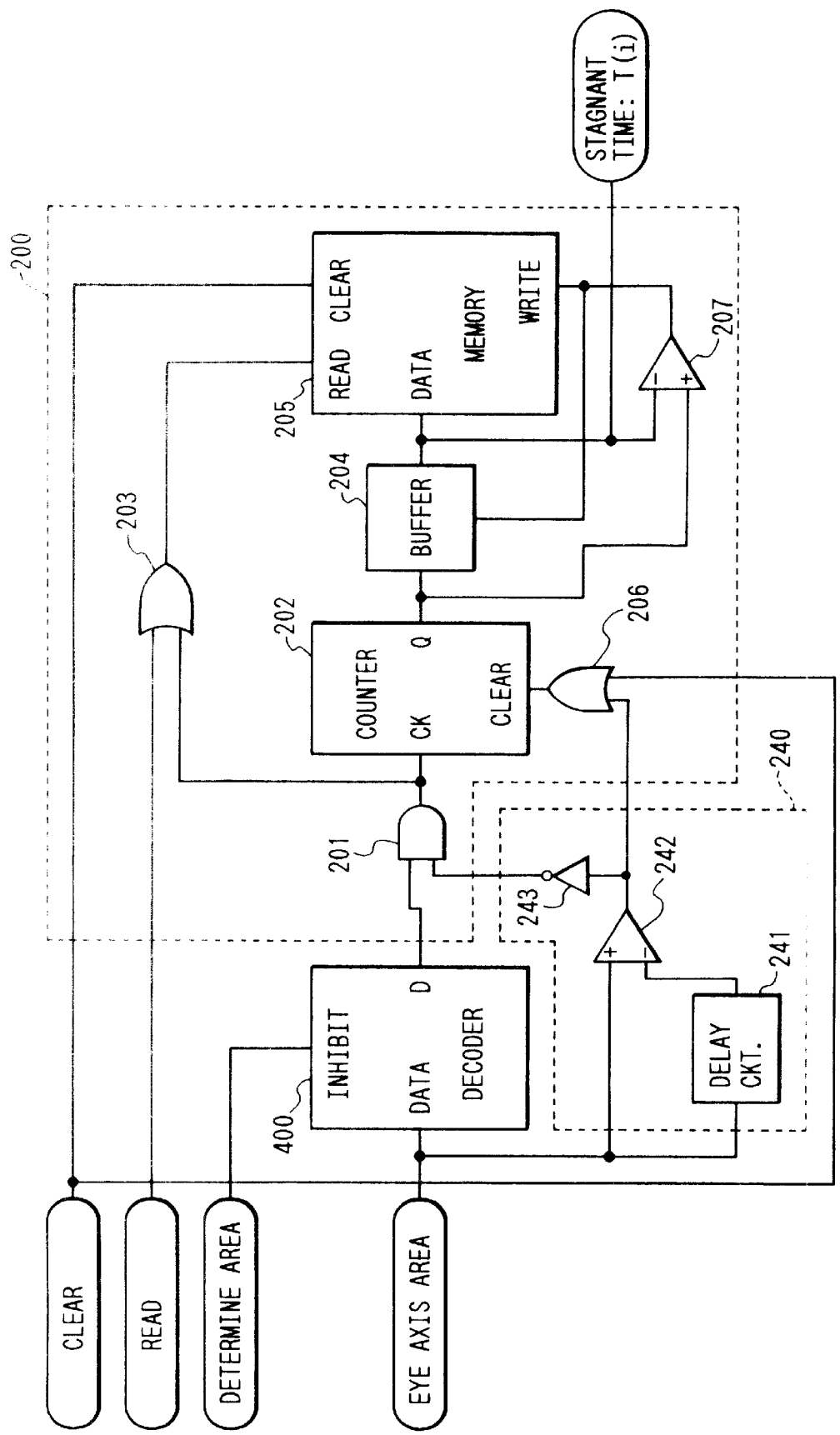

As shown in FIG. 6C, the stagnant discrimination circuit 240 compares the directly previous area information passing through a delay circuit 241 with the current area information, and if they are equal, a signal instructing the count-up is sent to the stagnant time calculation circuit. In the stagnant time calculation circuit 200 having the decoded output sent, the output of the AND circuit 201 becomes high, so that the counter 202 is counted up. Note that this counter 202 is cleared when it is determined that the previous area and the current area are not equal in the stagnant discrimination circuit, and when the CLEAR signal occurs. The output of the counter 202 is stored in the memory 205 after being counted up. If that counter output is greater as compared with the maximum stagnant time up to that time, it is stored via the buffer 204 in the memory 205, as the new maximum value. The content of this memory is read out when the release is instructed (or the READ signal occurs), in addition to the time when the count up is made. Also, it is cleared when the CLEAR signal occurs.

Figure 6D:
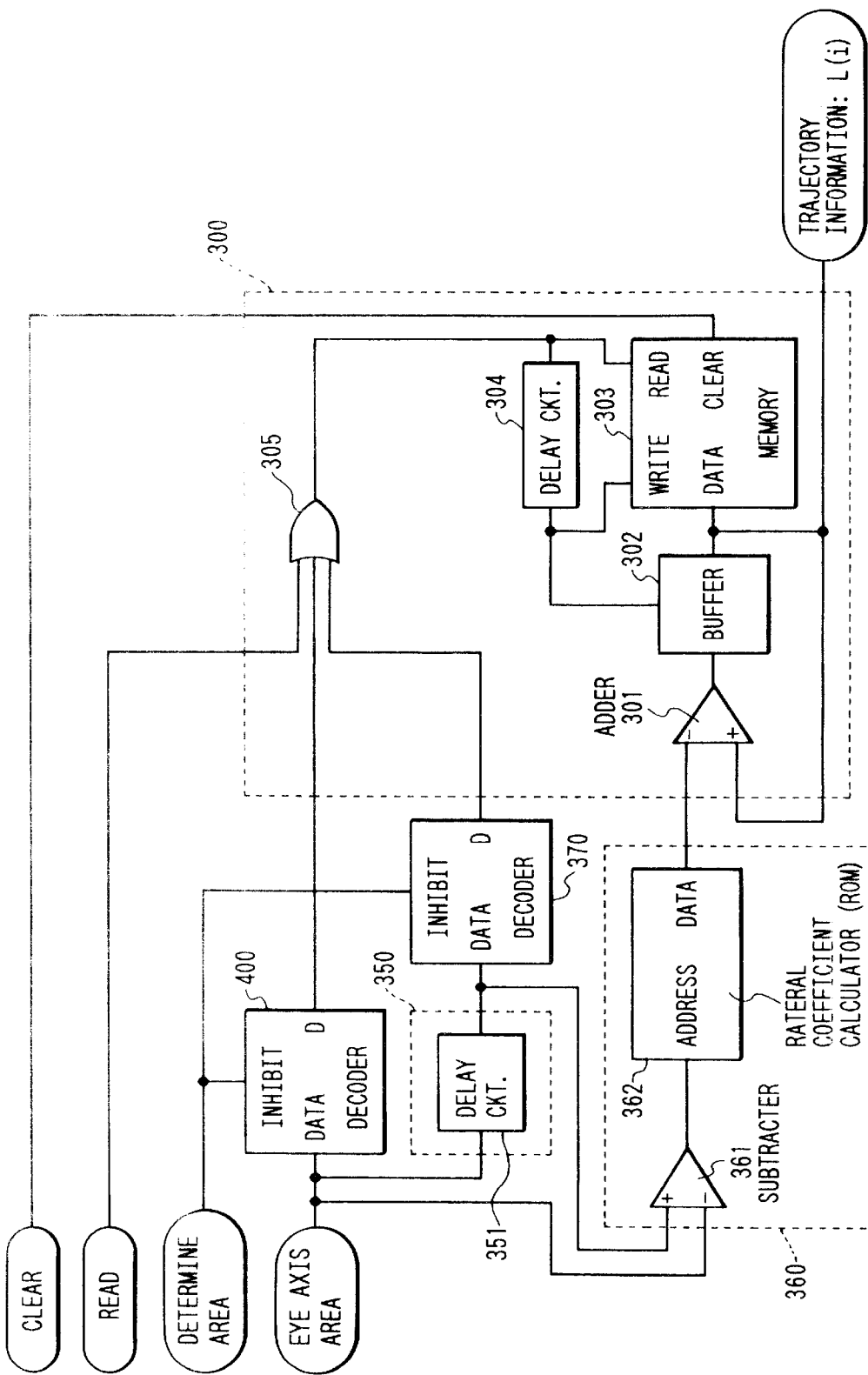

FIG. 6D shows the trajectory information calculation circuit when the correlation coefficient with the immediately previous (one time previous) area information is calculated.

The correlation coefficient calculation circuit 360 obtains the difference between the immediately previous area information passing through the delay circuit 351 and the current area information calculate in a subtracter 361, and calculates the correlation coefficient corresponding to that difference in the correlation coefficient calculator 362 constituted of ROM. Also, the output of the delay circuit 351 is also input into the decoder 370. The outputs of the decoders 370, 400 are ORed in an OR circuit 305, and the calculated result of the calculator 362 is added to both the current area and the immediately previous area. That is, if the output of the OR circuit 305 becomes high, data (trajectory information) provided up to that time is read out from the memory 303, and added with the calculated result of the calculator 362 in an adder 301. The output of the OR circuit 305 passes through the delay circuit 304, and after a certain time delay, is given to the WRITE terminal of the memory 303, so that the result of the adder 301 is stored via the buffer 302 in the memory at this timing. The content of this memory is also read out when the release is instructed (or the READ signal occurs). Its content is cleared when the CLEAR signal occurs.

Figure 6E:
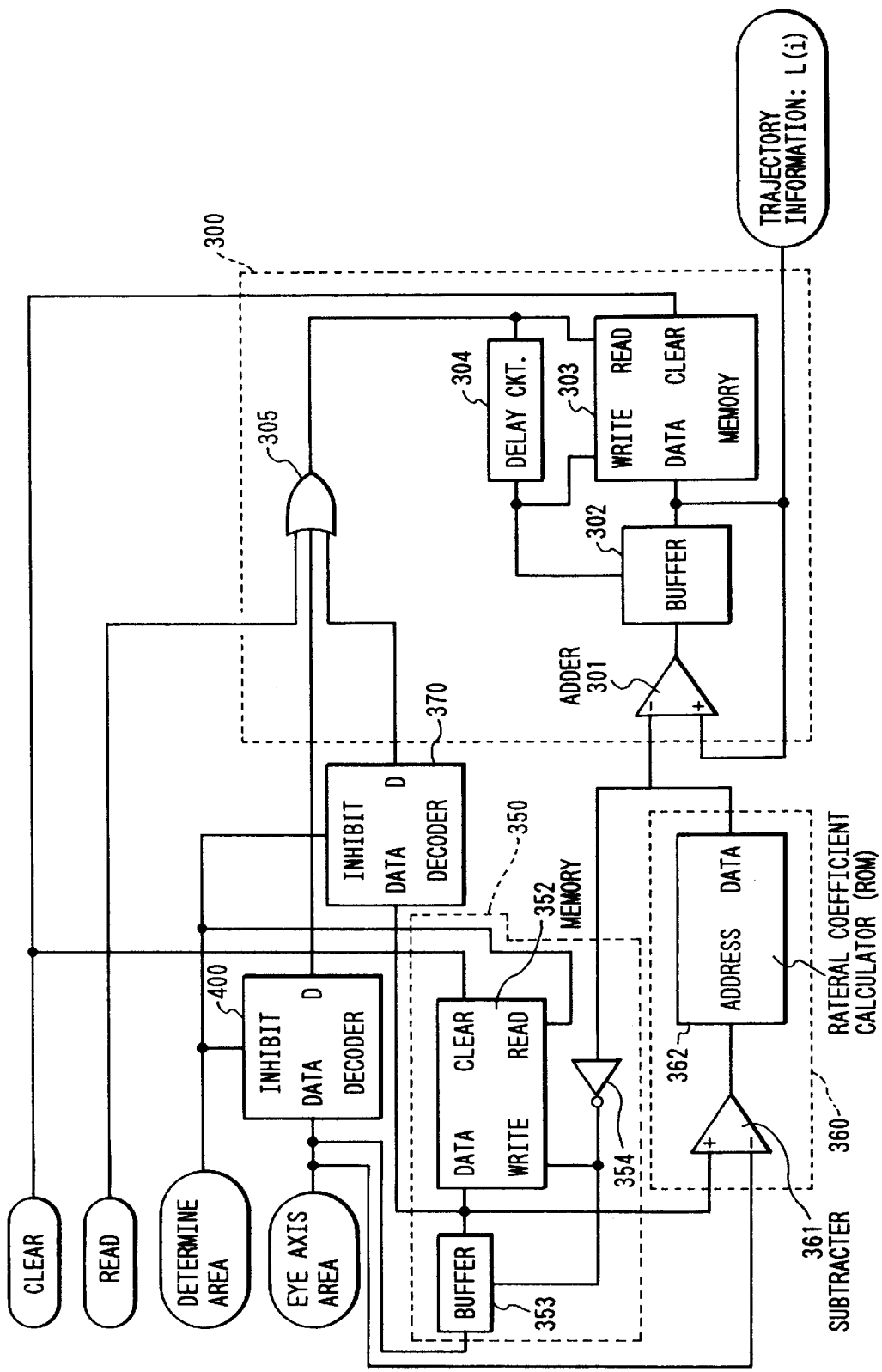

FIG. 6E shows the trajectory information calculation circuit for calculating the correlation coefficient with a point at which the correlation coefficient becomes zero (a first point after the eye axis has largely moved).

The correlation coefficient calculation circuit 360 calculates the difference between the area information stored in the memory 352 and the current area information in the subtracter 361, to obtain the correlation coefficient corresponding to that difference in the correlation coefficient calculator 362. If this result is zero, the WRITE instruction is given to the WRITE terminal of the memory 352, and the area information at that time is stored via the buffer 353 in the memory 352. Hence, in the memory 352 is stored the area information when the correlation coefficient becomes zero, i.e., the information of the first point after the eye axis has largely moved and the correlation with the previous eye axis trajectory has disappeared. Also, the result of the correlation coefficient calculator 362 is also given to the adder 301. On the other hand, the current area information is input into the decoder 400, and the area information of the memory 352 is input into the decoder 370. The outputs of these two decoders are ORed at 305, and the calculated result of 362 is added to both the current area and the area stored in the memory 352. That is, if the output of the OR circuit 305 becomes high, the trajectory information up to that time is read out from the memory 303, and added with the calculated result of 362 in the adder 301, and the output of 305 passes through the delay circuit 304, and thus, after a certain time of reading, is stored via the buffer 302 into the memory 303. Note that the content of this memory 303 is also read out when the release is instructed (or the READ signal occurs), and its content is cleared when the CLEAR signal occurs. When the CLEAR signal occurs, the content of the memory 352 is also cleared.

The numerical values obtained in the frequency calculation circuit, the stagnant time calculation circuit and the trajectory information calculation circuit as above are sent to the weighted mean circuits corresponding to the respective areas if the READ signal occurs. For example, the weighted mean circuit 410 for the zeroth area, 411 for the first area, 412 for the second area, 413 for the third area and so on. Each weighted mean circuit memorizes each information for the frequency, stagnant time and trajectory input at that time in synchronism with the READ signal.

When the release signal occurs, the numerical values obtained in the frequency calculation circuit, the stagnant time calculation circuit and the trajectory information calculation circuit are sent again to the weighted mean circuits corresponding to the respective areas. The weighted mean circuit reads out last two calculated results that have been memorized previously, and obtains the total frequency, stagnant time, trajectory information, and the watching degree W(i) in each area. In the maximum area discrimination circuit 420 to which this calculated result is sent, the watching degrees are compared to determine the area giving the maximum value (watching point area), and its area number is output.

Note that the READ signal is output when the release is instructed and At is measured in a timer circuit, that is, at the release and in a $\Delta T$ interval from the start of the eye axis detection. Also, the CLEAR signal occurs when the release operation of camera is terminated, and when the zooming or panning is performed.

Figure 7B:
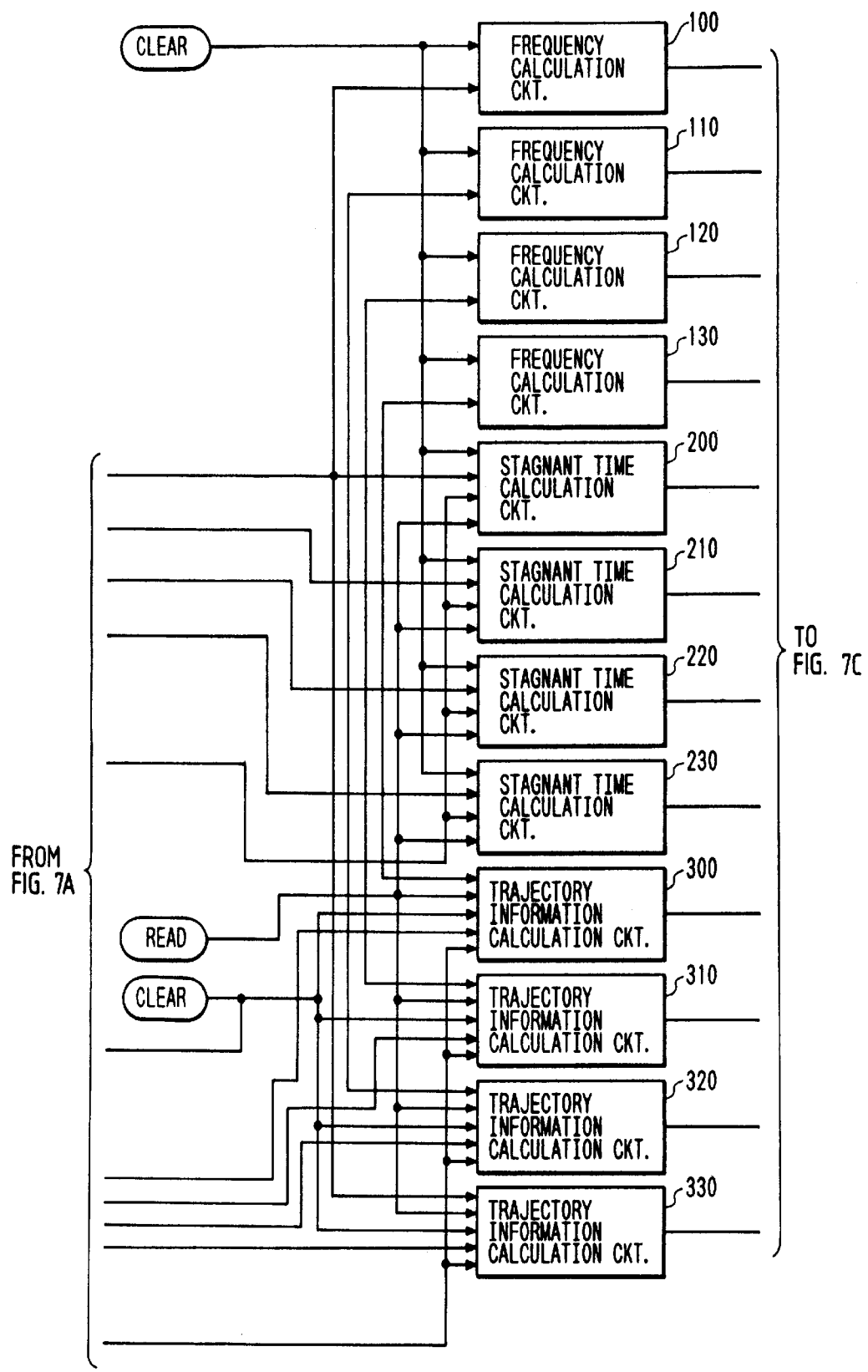
FIG. 7 is a circuit block diagram in a third example of the present invention.
Figure 7C:
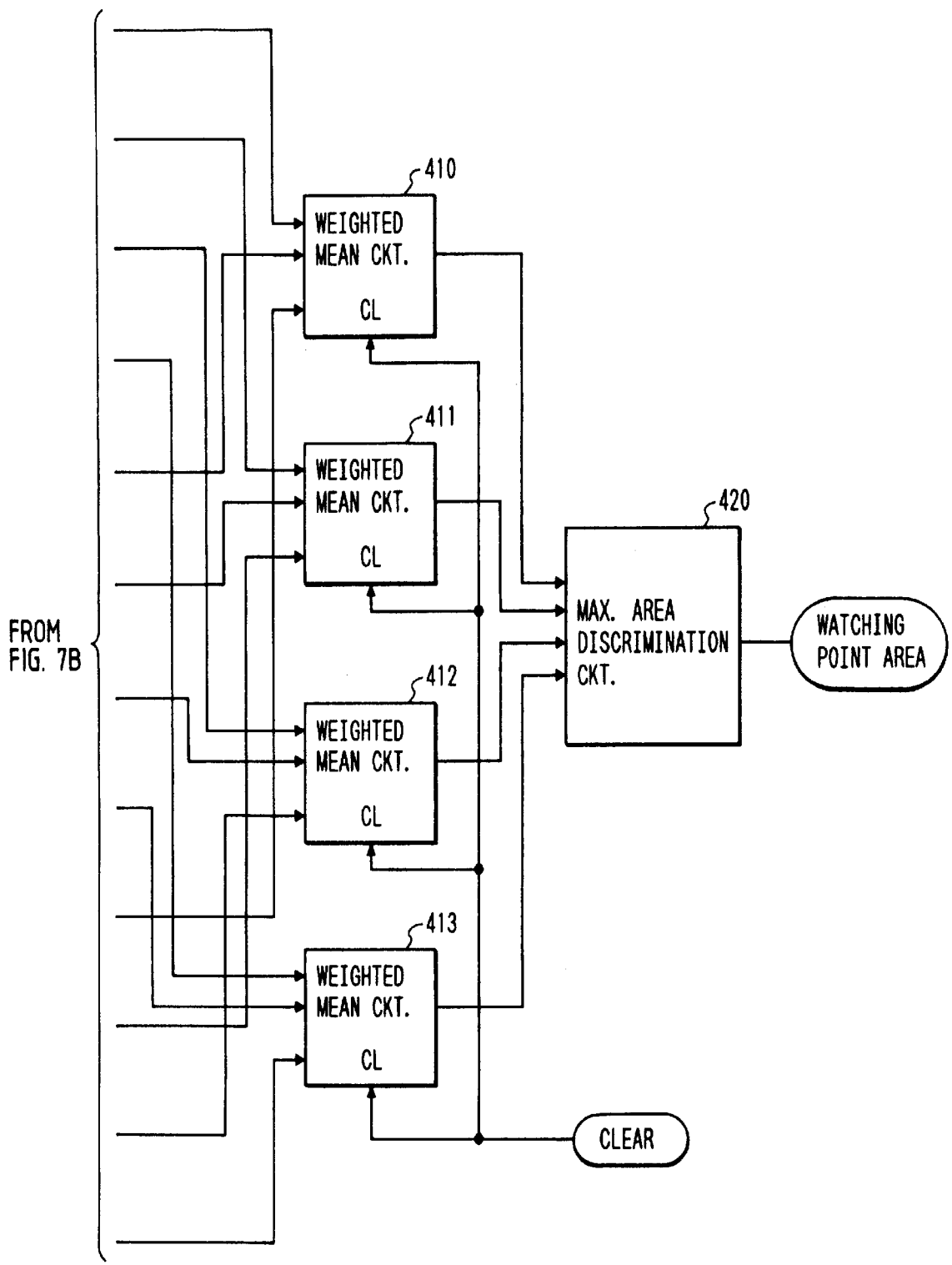
Figure 8:
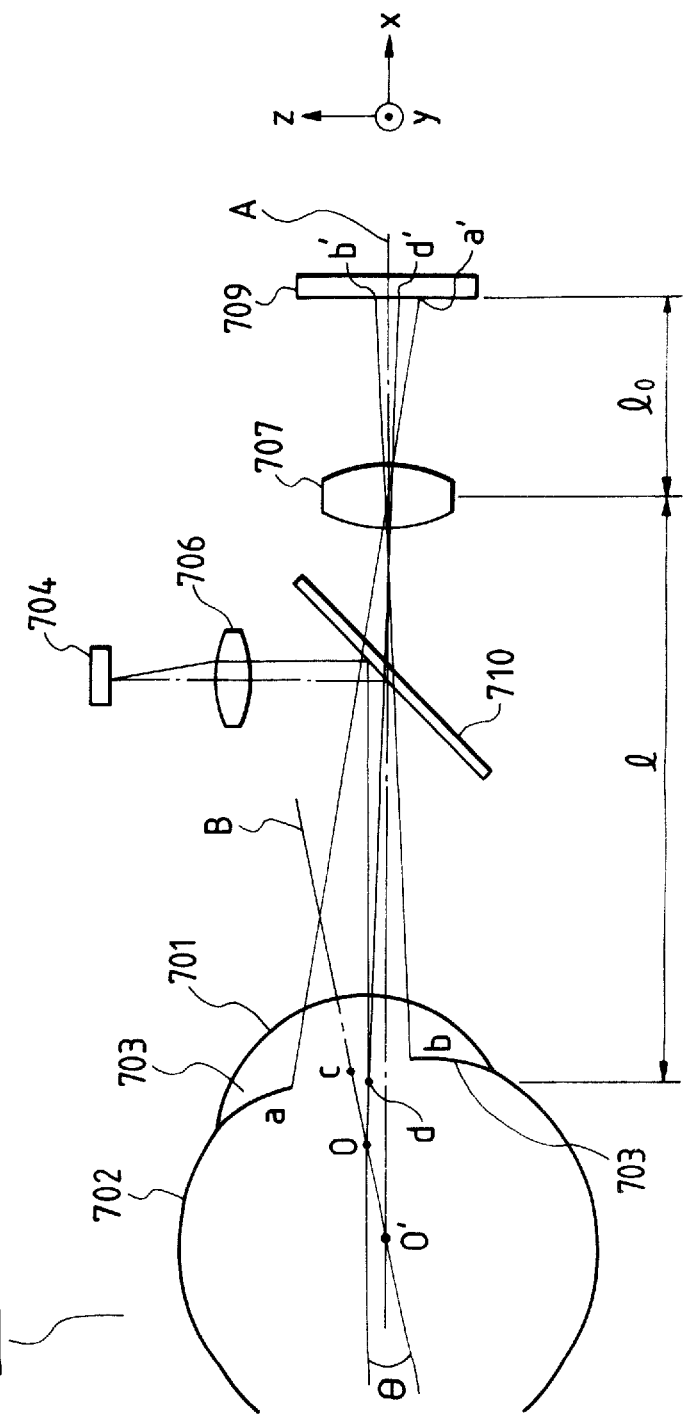
FIG. 8 is a cross-sectional view of the optics in a conventional example.

A block diagram in a third example of the present invention is shown in FIG. 7. The feature of the third example is to perform the eye axis calculation and the area discrimination in the M.P.U.1, and to send its result via the interface circuit 3 to a group of circuits for the extraction of watching points.

The M.P.U.1 reads an output image of the image sensor 4 via the interface circuit 3, calculates the purkinje image, pupil center and eye axis based on this image, obtains which area of this eye axis is located on a picture, and sends its value to the group of circuits for the extraction of watching points. The group of circuits receiving a signal from the M.P.U.1 calculates the frequency, stagnant time and trajectory information in the same operation as in the second example, and its result is sent to the weighted mean circuit, and further to the maximum area discrimination circuit, so that the watching point is obtained.

Note that in the third example, the CLEAR signal and the READ signal are given by the M.P.U.1.

The fourth example is such that the watching point of photographer is determined using the fuzzy theory. That is, the watching point $(i_c, j_c)$ is determined from the frequency N(i,j) and the stagnant time T(i,j) at (i,j) in $T_{start} \leq t \leq T_{final}$, when the position of eye axis at the time t=T is (i,j), using the fuzzy theory.

Note that the fuzzy theory is one as proposed by L. A. Zadch professor in Berkeley School, California University, 1965, and published and well known currently as "Fuzzy theory and its applications" in Behavior metrics Vol. 13 No. 2 (whole number 25) 1986 pp. 64–89. The fuzzy theory is appropriate for quantifying the know-how expressed by the words. Thus, the know-how as expressed below is quantified as rule 1 and rule 2.

(1) There is a relation between the watching point and its eye axis frequency. That is, the greater the frequency, the higher the possibility of the watching point.

(2) There is a relation between the watching point and its stagnant time. That is, the longer the stagnant time, the higher the possibility of the watching point.

(3) There is a relation between the watching point and the time until snapping the shutter. That is, the closer the eye axis is obtained to snapping the shutter, the higher the possibility of the watching point.

Figure 9A:
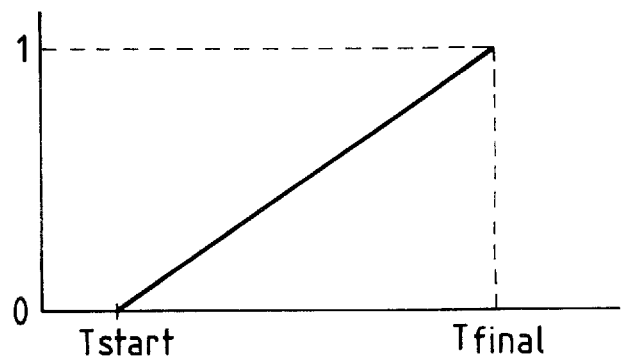
FIGS. 9A–9C are graphs of the functions as represented by the fuzzy set.
Figure 9B:
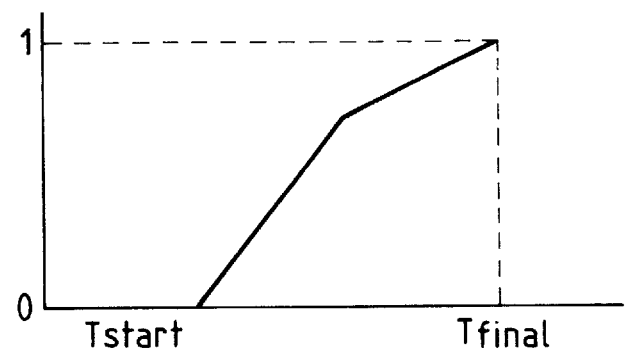
Figure 9C:
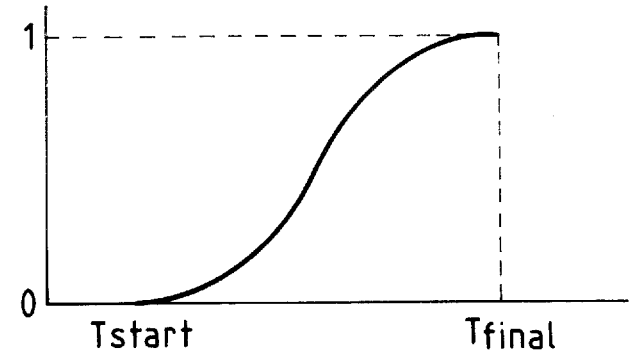

Rule 1 can be represented as "the greater the frequency immediately before snapping the shutter, the higher the possibility of the watching point". That is, the evaluation function $E_{val}N(i,j)$ for the frequency N(i,j) at the point (i,j) in $T_{start} \leq t \leq T_{final}$ is $$E_{val}N(i,j) = \sum_{T_{start}}^{T_{final}} f_n(t) \cdot N(i,j).$$

Where $f_n(t)$ is a function as represented by the fuzzy set shown in FIG. 9A. However, $f_n(t)$ is a function in accordance with the time when the shutter is snapped, and is not limited to the above example, but may be a function as shown in FIGS. 9B and 9C.

Rule 2 can be represented as "the longer the stagnant time immediately before snapping the shutter, the higher the possibility of the watching point." That is, the evaluation function $E_{val}T(i,j)$ for the stagnant time T(i,j) at the point (i,j) in $T_{start} \leq t \leq T_{final}$ is $$E_{val}N(i,j) = \sum_{T_{start}}^{T_{final}} f_n(t) \cdot N(i,j).$$

Where $f_n(t)$ is a function as represented by the fuzzy set as in the rule 1. As the watching point can be obtained with the Max operation of rule 1 and rule 2, the watching point (ic,jc) can be determined by obtaining (i,j) which maximizes Max($E_{val}N(i,j), E_{val}T(i,j)$).

Figure 10:
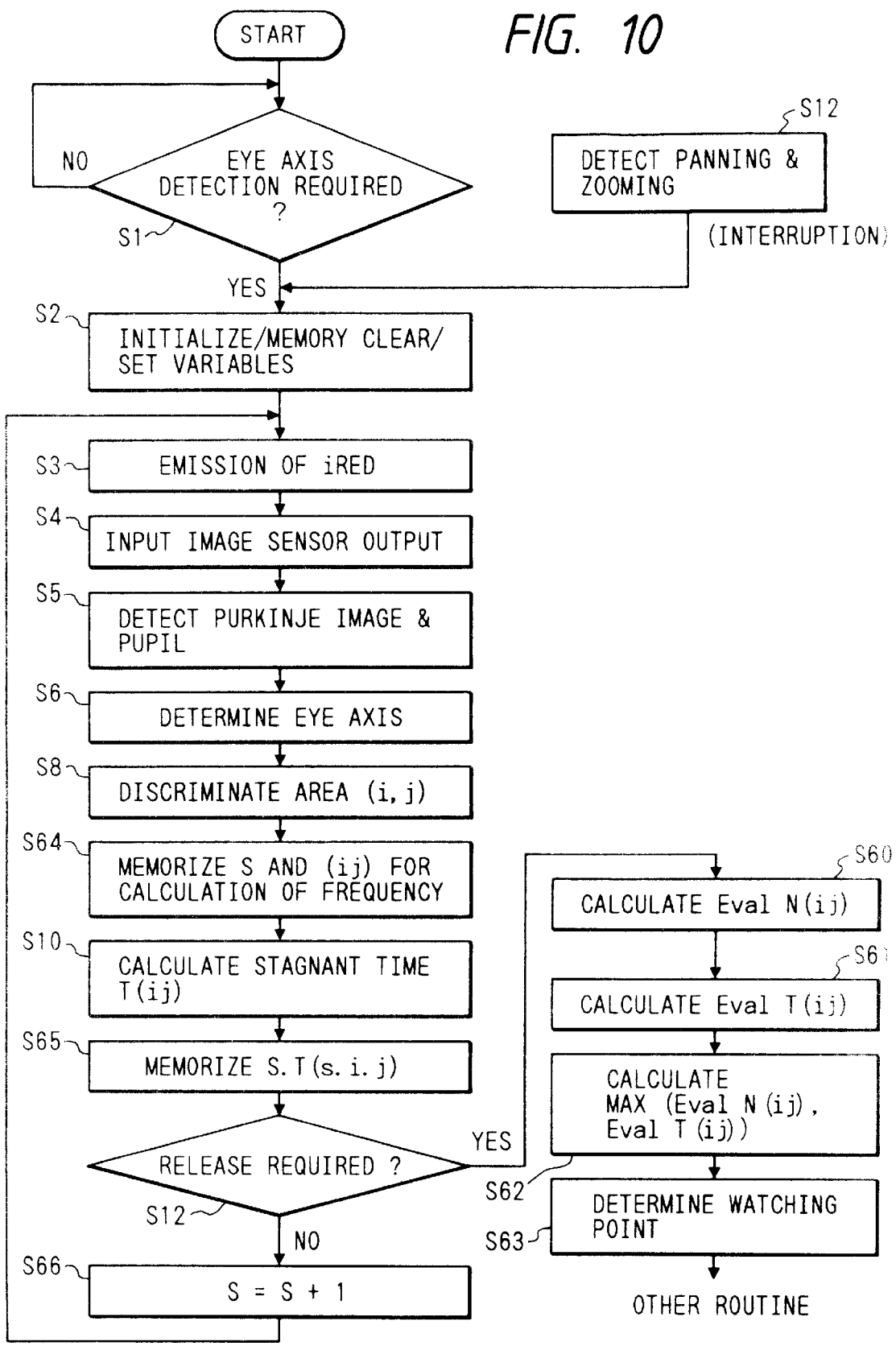
FIG. 10 is a flowchart in a fourth example.

The M.P.U.1 reads an output image of the image sensor 4 via the interface circuit 3, and calculates the purkinje image, pupil center and the eye axis position (i,j) by processing its image. Then, the M.P.U.1 performs the fuzzy operation as above described, to obtain the watching point position (ic, jc). That is, the evaluation functions $E_{val}N(i,j)$ and $E_{val}T(i,j)$ for the frequency and the stagnant time are obtained after the release is required, as shown in FIG. 10 (steps 60, 61). For this purpose, first, the time S and the eye axis area at that time are memorized (step 64), and using this value after the release is required, $E_{val}N(i,j)$ is obtained by repeating the operation, $$E_{val}N(i,j) = E_{val}N(i,j) + f(s)$$

from S=1 to S=S (step 66). Also, the stagnant time is calculated as in the first example, and this value T(S,i,j) and the time S at that time are memorized (step 64). And after the release is required, $E_{val}T(i,j)$ is obtained as $$E_{val}T(i,j) = \sum_{S=0}^{S} T(s,i,j) \cdot f(s)$$

(step 61). And then $Max(E_{val}N(i,j), E_{val}T(i,j))$ is calculated (step 62), (i,j) at which that value is at maximum is obtained, and is set as the watching point (step 63).

As above described, according to the present invention, the extraction of the watching point intended by the user or photographer can be achieved by multi-dividing a picture, and using a plurality of informations such as the frequency, the stagnant time, and the correlation degree (trajectory information) based on the difference between the previous position provided immediately or a fixed time before (first point at which the eye axis has largely moved) and the current position for the eye axis of a user or photographer in the divided picture.

What is claimed is:

1. An apparatus for determining a watching point comprising:
   means for sequentially forming a plurality of data each of which corresponds to a direction of a visual axis; and
   means for evaluating said plurality of sequentially formed data with each of a plurality of kinds of functions and determining said watching point based on a result of evaluating the Plurality of sequentially formed data with each of the plurality of kinds of functions.

2. An apparatus according to claim 1, characterized by using information of frequency at which the visual axis exists in an area, as one of the plurality of sequentially formed data for use in deciding said watching point.

3. An apparatus according to claim 1, characterized by using information of stagnant time in which the visual axis stays in an area, as one of the plurality of sequentially formed data for use in deciding said watching point.

4. An apparatus according to claim 2, characterized by using information of stagnant time in which the visual axis stays in an area, as one of the plurality of sequentially formed data for use in deciding said watching point.

5. An apparatus according to claim 1, characterized by using trajectory information of the visual axis in an area, as one of the plurality of sequentially formed data for use in deciding said watching point.

6. An apparatus according to claim 2, characterized by using trajectory information of the visual axis in an area, as one of the plurality of sequentially formed data for use in deciding said watching point.

7. An apparatus according to claim 3, characterized by using trajectory information of the visual axis in an area, as one of the plurality of sequentially formed data for use in deciding said watching point.

8. An apparatus according to claim 1, characterized in that information concerning the visual axis in an area is obtained at each predetermined time, and its information is stored in a memory.

9. An apparatus according to claim 1, wherein the plurality of kinds of functions have a function for evaluating the data by using a difference between a datum and a datum just before or after the former datum of said formed data.

10. A camera having an apparatus for determining a watching point comprising:
    means for sequentially forming a plurality of data each of which corresponds to a direction of a visual axis; and
    means for evaluating said plurality of sequentially formed data with each of a plurality of kinds of functions and determining said watching point based on a result of evaluating the plurality of sequentially formed data with each of the plurality of kinds of functions.

11. A camera having the apparatus according to claim 10, characterized by using information of frequency at which the visual axis exists in an area, as one of the plurality of sequentially formed data for use in deciding said watching point.

12. A camera having the apparatus according to claim 10, characterized by using information of stagnant time in which the visual axis stays in an area, as one of the plurality of sequentially formed data for use in deciding said watching point.

13. A camera having the apparatus according to claim 11 characterized by using information of stagnant time in which the visual axis stays in an area, as one of the plurality of sequentially formed data for use in deciding said watching point.

14. A camera having the apparatus according to claim 10, characterized by using trajectory information of the visual axis in an area, as one of the plurality of sequentially formed data for use in deciding said watching point.

15. A camera having the apparatus according to claim 11, characterized by using trajectory information of the visual axis in an area, as one of the plurality of sequentially formed data for use in deciding said watching point.

16. A camera having the apparatus according to claim 12, characterized by using trajectory information of the visual axis in an area, as one of the plurality of sequentially formed data for use in deciding said watching point.

17. A camera having the apparatus according to claim 10, characterized in that sequentially formed data concerning the visual axis in an area is obtained at a predetermined time, and the sequentially formed data is stored in a memory.

18. A camera having the apparatus according to claim 10, characterized by further providing control means for clearing a calculated result for deciding the watching point in the course of zooming or panning of the camera.

19. A camera having the apparatus according to claim 10, characterized in that the plurality of sequentially formed date concerning said visual axis is given higher priorities when approaching closer to a release timing.

20. A camera having the apparatus according to claim 10, wherein the plurality of kinds of functions have a function for evaluating the data by using a difference between a datum and a datum just before or after the former datum of said formed data.

* * * * *

UNITED STATES PATENT AND TRADEMARK OFFICE
CERTIFICATE OF CORRECTION

PATENT NO. : 5,857,120  
DATED : January 5, 1999  
INVENTOR(S) : Kazuki Konishi

Page 1 of 2

It is certified that error appears in the above-identified patent and that said Letters Patent is hereby corrected as shown below:

Column 6, line 34, delete " $L_T(i)=L_m(L_{m-1}(i)+AL_{m-2}(i)$ " and insert -- $L_T(i)=L_m(i)+L_{m-1}(i)+AL_{m-2}(i)$ --.

Column 6, line 43, delete "At" and insert -- $\Delta t$ --.

Column 7, line 10, delete "W1-W3>K" and insert --W1-W4>K--.

Column 8, line 4, delete "At" and insert -- $\Delta t$ --.

Column 9, line 41, delete "At" and insert -- $\Delta t$ --.

Column 10, line 24, delete "point"." and insert --point."--.

Column 10, line 43, delete "$f_n(t) \cdot N(i,j)$" and insert -- $f_n(t) \cdot T(i,j)$ --.

UNITED STATES PATENT AND TRADEMARK OFFICE
CERTIFICATE OF CORRECTION

PATENT NO.  : 5,857,120
DATED       : January 5, 1999
INVENTOR(S) : Kazuki Konishi It is certified that error appears in the above-identified patent and that said Letters Patent is hereby corrected as shown below:

Column 11, line 27, delete "Plurality" and insert --plurality--.

Signed and Sealed this

Tenth Day of August, 1999

Attest:

Q. TODD DICKINSON

*Attesting Officer*        *Acting Commissioner of Patents and Trademarks*